US011913415B2

(12) United States Patent
Geyer

(10) Patent No.: US 11,913,415 B2
(45) Date of Patent: Feb. 27, 2024

(54) TAPPET FOR ACTING ON A PUMP PISTON OF A HIGH-PRESSURE FUEL PUMP

(71) Applicant: Schaeffler Technologies AG & Co. KG, Herzogenaurach (DE)

(72) Inventor: Norbert Geyer, Höchstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/800,319

(22) PCT Filed: Jan. 19, 2021

(86) PCT No.: PCT/DE2021/100058
§ 371 (c)(1),
(2) Date: Aug. 17, 2022

(87) PCT Pub. No.: WO2021/164807
PCT Pub. Date: Aug. 26, 2021

(65) Prior Publication Data

US 2023/0066007 A1 Mar. 2, 2023

(30) Foreign Application Priority Data

Feb. 19, 2020 (DE) ..................... 10 2020 104 313.9

(51) Int. Cl.
*F02M 59/10* (2006.01)
*F04B 9/02* (2006.01)
(Continued)

(52) U.S. Cl.
CPC ............. *F02M 59/102* (2013.01); *F01L 1/14* (2013.01); *F01L 1/16* (2013.01); *F04B 9/02* (2013.01);
(Continued)

(58) Field of Classification Search
CPC .. F02M 59/102; F02M 41/042; F02M 45/063; F01L 1/14; F01L 1/16; F01L 1/143; F01L 1/146; F04B 9/02; F04B 1/0426
(Continued)

(56) References Cited

U.S. PATENT DOCUMENTS 3,752,130 A * 8/1973 Scheibe .................... F01L 1/20 74/569
4,526,519 A * 7/1985 Mowbray .............. F02M 59/44 417/490
(Continued)

FOREIGN PATENT DOCUMENTS

DE 102004056458 A1 * 6/2006
DE 102009013132 A1 9/2010
(Continued)

*Primary Examiner* — Sizo B Vilakazi
*Assistant Examiner* — Brian R Kirby

(57) ABSTRACT

The disclosure relates to a tappet for acting on a pump piston of a high-pressure fuel pump of an internal combustion engine. The tappet includes a tubular housing, and at the upper annular end face of the tubular housing, two surfaces which are indented relative to the outer casing of the housing and comprise a pin that supports a cam roller, lie diametrically opposite each other. An upper end face of a transverse beam lies against axial inner end faces of the two surfaces. A transverse beam lower end face, which faces a lower annular end face of the housing, is provided with a pin, which protrudes from the housing and is surrounded by a spring plate supported against the inner casing of the housing. A sleeve-like inner collar of the spring plate guides the unstepped pin.

20 Claims, 2 Drawing Sheets

(51) Int. Cl.

| | |
|---|---|
| ***F01L 1/16*** | (2006.01) |
| ***F01L 1/14*** | (2006.01) |
| ***F02M 41/04*** | (2006.01) |

(52) U.S. Cl.
CPC ............... *F01L 1/143* (2013.01); *F01L 1/146* (2013.01); *F02M 41/042* (2013.01)

(58) Field of Classification Search
USPC ................................ 123/90.48, 90.49, 90.67
See application file for complete search history.

(56) References Cited

U.S. PATENT DOCUMENTS 4,728,269 A * 3/1988 Hafele ................... F02M 59/48 417/490
4,951,619 A * 8/1990 Schaeffler ................. F01L 1/25 123/90.55
5,415,533 A * 5/1995 Egger .................... F02M 59/44 417/471
5,664,530 A * 9/1997 Ammon .................. F01L 1/143 123/90.55
5,676,098 A * 10/1997 Cecur ....................... F01L 1/20 123/90.52
5,752,430 A * 5/1998 Kawajiri ............... F04B 1/0439 417/471
5,775,203 A * 7/1998 Osborn .............. F02M 63/0001 417/470
5,870,985 A * 2/1999 Bretting .................... F01L 1/25 123/90.55
6,065,435 A * 5/2000 Speil ......................... F01L 1/25 123/90.55
6,217,299 B1 * 4/2001 Jay ......................... F02M 59/44 123/495
6,412,474 B1 * 7/2002 Guentert ............ F02M 63/0225 123/456
6,513,470 B1 2/2003 Hendriksma et al.
6,523,524 B1 * 2/2003 Simon .................. F02M 59/102 123/450
6,910,407 B2 * 6/2005 Furuta .................... F02M 59/06 92/72
6,951,165 B2 * 10/2005 Kuhn .................... F04B 1/0426 92/72
7,308,849 B2 * 12/2007 Schoetz ................. F02M 59/06 92/72
7,384,246 B2 * 6/2008 Diaferia ................ F04B 1/0426 92/72
8,235,018 B2 * 8/2012 Dorn ....................... F04B 9/045 123/90.48
8,256,394 B2 * 9/2012 Haas ....................... F01L 1/143 123/90.48
8,474,427 B2 * 7/2013 Dorn ................... F04B 27/0442 123/90.48
8,607,754 B2 * 12/2013 Dorn ..................... F04B 1/0426 123/90.48
8,627,801 B2 * 1/2014 Dorn ..................... F04B 53/147 123/495
8,800,519 B2 * 8/2014 Dorn ......................... F01L 1/14 123/90.48
8,820,300 B2 * 9/2014 Aritomi ................ F04B 1/0426 123/495
8,863,716 B2 * 10/2014 Dorn ....................... F04B 53/14 123/90.5
8,985,077 B2 * 3/2015 Chern ....................... F01L 3/20 123/90.47
9,291,247 B2 * 3/2016 Dorn ..................... F04B 1/0408
9,709,055 B2 * 7/2017 Usui ................... F04B 11/0033
9,803,515 B2 * 10/2017 Oka .......................... F01L 1/14
9,885,330 B1 * 2/2018 Xu ....................... F02M 59/102
10,024,286 B2 * 7/2018 Brune .................. F02M 59/102
10,408,093 B2 * 9/2019 Xu ........................ F04B 1/0426
10,697,413 B2 * 6/2020 Brune ..................... F16H 53/06
11,111,893 B2 * 9/2021 Brune .................. F02M 59/102
11,215,269 B2 * 1/2022 Abrahamson ........... F16H 53/06
2008/0190237 A1 * 8/2008 Radinger ................ F01L 1/143 74/569
2009/0071446 A1 * 3/2009 Sato ...................... F04B 1/0439 123/495
2011/0253109 A1 * 10/2011 Usui ...................... F02M 39/02 123/509
2012/0180764 A1 * 7/2012 Aritomi ............... F02M 59/102 123/495
2013/0084198 A1 * 4/2013 Wood ................... F02M 59/027 417/374
2015/0159610 A1 * 6/2015 Dorn .................... F02M 59/102 92/129
2015/0361937 A1 * 12/2015 Geyer ................... F04B 1/0408 417/364
2016/0245248 A1 * 8/2016 Ando .................... F04B 1/0408
2017/0089311 A1 * 3/2017 Lucas .................. F02M 59/025
2018/0010562 A1 * 1/2018 Oikawa .................. F02M 59/48

FOREIGN PATENT DOCUMENTS

| | | | | |
|---|---|---|---|---|
| DE | 102010011435 A1 | 9/2011 | | |
| DE | 102010022319 A1 | 12/2011 | | |
| EP | 2951435 B1 | 2/2017 | | |
| JP | H03294653 A | 12/1991 | | |
| WO | WO-03046379 A1 * | 6/2003 | ............ | F04B 1/0408 |
| WO | WO-2006037676 A1 * | 4/2006 | ............ | F04B 1/0426 |

* cited by examiner

TAPPET FOR ACTING ON A PUMP PISTON OF A HIGH-PRESSURE FUEL PUMP

CROSS-REFERENCE TO RELATED APPLICATIONS

This application is the U.S. National Phase of PCT Application No. PCT/DE2021/100058 filed on Jan. 19, 2021, which claims priority to DE 10 2020 104 313.9 filed on Feb. 19, 2020, the entire disclosures of which are incorporated by reference herein.

TECHNICAL FIELD

This disclosure relates to a tappet for acting on a pump piston of a high-pressure fuel pump of an internal combustion engine.

BACKGROUND

EP 2 951 435 B1 (FIGS. 1, 2) discloses a short tappet which acts directly on a pump piston via its transverse beam. A ring is seated in an annular groove of an inner casing of a housing of the tappet, which ring has tabs bent radially inward that fix the transverse beam in the direction away from the cam. The pump piston is connected to the tappet via a spring plate.

SUMMARY

The object is to create a tappet that is suitable for long installation distances between cams and pump pistons and that can also be used variably and is light and simple in construction.

According to the disclosure, this object is achieved in that the spring plate with a sleeve-like inner collar guides the non-stepped pin and runs from an annular end face of the inner collar facing the transverse beam in the direction of the inner casing of the housing with a wedged piece that is bent in the direction of the transverse beam, over the annular tip of which the transverse beam is held opposite the surface and wherein the pin acts as an elongation of the tappet to the pump piston.

Such a tappet therefore essentially uses a short standard tappet, which is advantageously made of sheet steel, and lengthens said tappet with little effort. This means that the large installation distances between the drive (cams/eccentrics) and the output (pump piston) that are found in modern pump drives can be bridged in a simple design. It is possible to keep only one "basic tappet" available for different pump drive types. An adaptation is made only by varying a length of the thin-walled and unstepped pin, which is cleverly guided and held via the spring plate and can be delivered with the tappet installed.

At the same time, the spring plate fixes the bridge piece to the surface from below. Separate supports can therefore be dispensed with.

For a simple angle error compensation in the drive, it is proposed to design the spring plate with its annular tip, which can also be a plateau or the like, at a slight distance from the transverse beam. This allows the transverse beam to "tilt" toward the surface about an axis of the pin with the cam follower roller, which can compensate for inaccuracies in the perpendicular approach of the pump piston to the tappet. The tilting of the transverse beam is ultimately influenced by setting the size of this distance. Equally, however, a fixed contact of the transverse beam on the surface is provided.

According to a further example embodiment of the disclosure, to put it simply, the transverse beam should not be wider than the length of the bowstring-like edges of the surface. Thus, only a small amount of space and mass is required. The transverse beam has an upper end face that nestles against the bulge of the surface. It can consist of sheet steel and can be provided with a wear protection measure such as an applied layer such as a DLC layer on its underside, at least in the contact area of the pin.

A simple attachment of the spring plate to the inner casing of the housing is also proposed. This can be welded to the inner casing via an annular collar or press-fitted/snap-fitted there. In this case, the inner casing i can be smooth-walled and not stepped.

Perforations in the spring plate also ensure that media such as oil and fuel can pass through unhindered and prevent "pumping up".

Finally, a simple transport lock for the pin using a snap ring connection is also proposed. The snap ring is seated in an annular groove of the pin above the inner collar of the spring plate.

DETAILED DESCRIPTION

Figure 1:
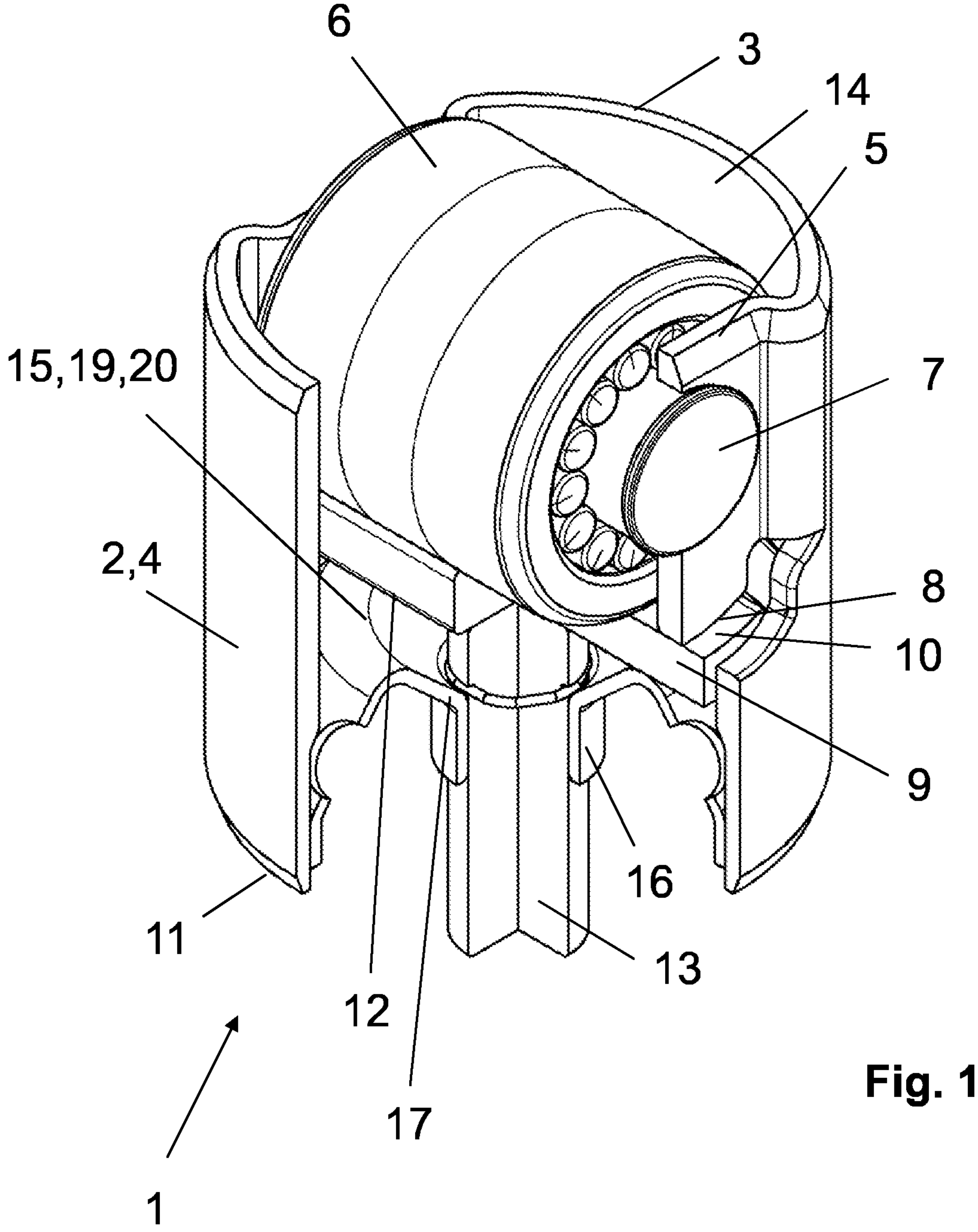
FIG. 1 shows the tappet in a spatial, partially broken open view.
Figure 2:
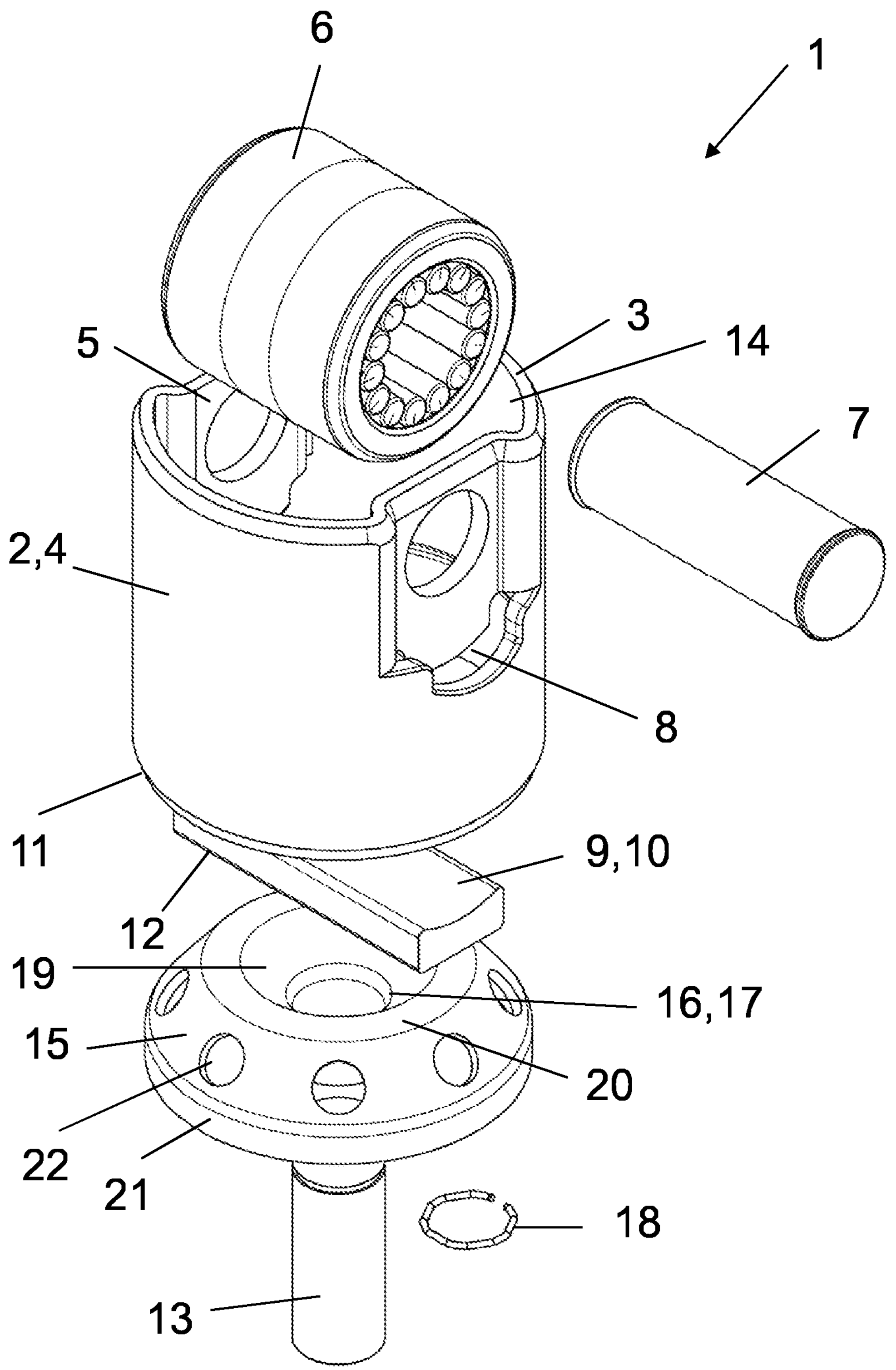
FIG. 2 shows the tappet according to FIG. 1 in an exploded view.

From FIGS. 1, 2, a tappet 1 is removable. This serves to load a pump piston of a high-pressure fuel pump of an internal combustion engine. The tappet 1 has a tube-like housing 2 made of thin-walled sheet steel with a height-to-diameter ratio in the range of about "1". In other words, the housing 2 is comparatively short.

At an upper annular end face 3 of the housing 2, two surfaces 5 indented relative to an outer casing 4 of the housing 2 lie diametrically opposite one another. In these surfaces 5 sits a pin 7, which carries a cam follower roller 6 mounted on roller bearings. A comparatively narrow transverse beam 9 rests with its upper end face 10 on axial, secant-like inner end faces 8 of the surface 5, thus facing away from the upper annular end face 3. As can best be seen from FIG. 2, an upper end face 10 of the transverse beam 9 has a concave profile which is complementary to the inner end faces 8 of the surface 5. The transverse beam 9 has a width which corresponds approximately to the "length" of the surface 5.

A pin 13 (see in particular FIG. 1) is seated on a lower end face 12 of the transverse beam 9, which faces a lower annular end face 11 of the housing 2. This protrudes beyond the lower annular end face 11 of the housing 2. The pin 13 is surrounded and guided by an inner collar 16 of a spring plate 15. The spring plate 15 consists of sheet steel.

From an annular end face 17 of the inner collar 16 facing the transverse beam 9, the spring plate 15 is continued radially in the direction of the inner casing 14 of the housing 3 with a wedged piece 19 which has a bent profile in the direction of the transverse beam 9. Radially on the outside, the wedged piece 19 transitions into an annular collar 21 pointing "downward", which bears against the inner casing 14 of the housing 2 and is welded to it. At the same time, the wedged piece 19 rests via its annular tip 20 against the lower end face 12 of the transverse beam 9 (see FIG. 1) and ultimately braces it against the surface 5.

Alternatively, the spring plate 15 with its annular tip 20 can also be slightly spaced apart from the wedged piece 19. In this design, a certain angular mobility of the transverse beam 9 with the pin 13 seated on it is made possible in relation to the surface 5 for the purpose of compensating for perpendicularity errors in the drive.

As shown in FIG. 2, the spring plate 15 is provided with a plurality of circular perforations 22 for media to pass through when the tappet 1 is in oscillating operation.

In addition, FIG. 1 shows that the pin 13 is captively secured on the spring plate 15 by a snap ring clip 18.

It should be noted that the pin 13 is a very simple extension of the tappet 1 and ultimately acts as an adapter piece between the tappet 1 and the pump piston and does not represent the pump piston.

LIST OF REFERENCE SYMBOLS

1 Tappet
2 Housing
3 Upper annular end face
4 Outer casing
5 Surface
6 Cam follower roller
7 Pin
8 Inner end face
9 Transverse beam
10 Upper end face
11 Lower annular end face
12 Lower end face
13 Pin
14 Inner casing
15 Spring plate
16 Inner collar
17 Annular end face
18 Snap ring clip
19 Wedged piece
20 Annular tip
21 Annular collar
22 Perforation

The invention claimed is:

1. A tappet configured for acting on a pump piston of a high-pressure fuel pump of an internal combustion engine, the tappet comprising:
- a tubular housing having two surfaces arranged diametrically opposite each other at an upper annular end face of the tubular housing, the two surfaces: i) indented relative to an outer casing of the tubular housing, and ii) comprising a first pin supporting a cam follower roller;
- a transverse beam having:
  - an upper end face configured to lie against axial inner end faces of the two surfaces; and
  - a lower end face facing a lower annular end face of the tubular housing is provided with a non-stepped second pin protruding from the tubular housing; and
- a spring plate attached to an inner casing of the tubular housing, the spring plate having:
  - a sleeve-like inner collar configured to guide the non-stepped second pin, the sleeve-like inner collar having an annular end face facing the transverse beam in a direction of the inner casing of the tubular housing; and
  - a wedged piece bent in a direction of the transverse beam and extending from the annular end face of the sleeve-like inner collar, and the transverse beam configured to be held relative to the two surfaces via an annular tip of the wedged piece and the non-stepped second pin configured as an adapter piece arranged between the tappet and the pump piston.

2. The tappet according to claim 1, wherein the axial inner end faces of the two surfaces are curved and complementary to at least a portion of the upper end face of the transverse beam.

3. The tappet according to claim 1, wherein the spring plate is spaced apart from the lower end face of the transverse beam via the annular tip.

4. The tappet according to claim 1, wherein the spring plate is attached to the inner casing of the tubular housing via an annular collar of the spring plate.

5. The tappet according to claim 4, wherein the annular collar of the spring plate is welded to the inner casing of the tubular housing.

6. The tappet according to claim 1, wherein the spring plate is provided with circumferentially distributed perforations.

7. The tappet according to claim 1, wherein the non-stepped second pin is longitudinally secured via a snap ring clip.

8. A tappet configured for acting on a pump piston of a high-pressure fuel pump of an internal combustion engine, the tappet comprising:
- a tubular housing having first and second indented surfaces arranged diametrically opposite each other at a first end of the tubular housing, the first and second indented surfaces configured to receive a first pin supporting a cam follower roller;
- a transverse beam having:
  - an upper end face configured to engage: i) a first axial inner end face of the first indented surface, and ii) a second axial inner end face of the second indented surface; and
  - a lower end face configured to engage a second pin, the second pin protruding beyond a lower annular end face of the tubular housing;
- a one-piece spring plate disposed within the tubular housing, the one-piece spring plate having:
  - an annular collar configured to attach the one-piece spring plate to an inner casing of the tubular housing; and
  - a sleeve-like inner collar configured to guide the second pin.

9. The tappet according to claim 8, wherein the first and second indented surfaces extend from an upper annular end face of the tubular housing.

10. The tappet according to claim 8, wherein the second pin is longitudinally secured via a snap ring clip.

11. The tappet according to claim 8, wherein the annular collar points downward and bears against the inner casing of the tubular housing.

12. The tappet according to claim 8, wherein the first and second axial inner end faces are curved.

13. The tappet according to claim 12, wherein portions of the upper end face that engage the first and second axial inner end faces are curved.

14. A tappet configured for acting on a pump piston of a high-pressure fuel pump of an internal combustion engine, the tappet comprising:
- a tubular housing having first and second indented surfaces arranged diametrically opposite each other at a first end of the tubular housing, the first and second indented surfaces configured to receive a first pin supporting a cam follower roller;

a transverse beam having:

an upper end face configured to engage: i) a first axial inner end face of the first indented surface, and ii) a second axial inner end face of the second indented surface; and a lower end face configured to engage a second pin, the second pin protruding beyond a lower annular end face of the tubular housing;

a spring plate disposed within the tubular housing, the spring plate having a wedged piece comprising:

a sleeve-like inner collar configured to guide the second pin, the sleeve-like inner collar having an annular end face; and from the annular end face, the spring plate extends radially outward and upward toward the lower end face of the transverse beam such that an annular tip is formed, the annular tip configured to rest against the lower end of the transverse beam; and from the annular tip, the spring plate extends radially outward and downward toward the lower annular end face of the tubular housing such that an annular collar is formed, the annular collar pointing downward and configured to attach the spring plate to an inner casing of the tubular housing.

15. The tappet according to claim 14, wherein the annular collar is attached to the inner casing of the tubular housing via welding.

16. The tappet according to claim 14, wherein the annular collar is attached to the inner casing of the tubular housing via a press-fit.

17. The tappet according to claim 1, wherein:

when the spring plate is attached to an inner casing of the tubular housing in a first attached position, the non-stepped second pin protrudes beyond the annular tip of the spring plate to engage the lower end face of the transverse beam, the non-stepped second pin configured to protrude beyond the annular tip of the spring plate via the pump piston; and when the spring plate is attached to an inner casing of the tubular housing in a second attached position, the non-stepped second pin and spring plate are both engaged with the lower end face of the transverse beam, the non-stepped second pin configured to engage the lower end face via the pump piston.

18. The tappet according to claim 3, wherein the spring plate is continuously spaced apart from the lower end face of the transverse beam via the annular tip.

19. The tappet according to claim 8, wherein the second pin is not a pump piston of the high-pressure fuel pump.

20. The tappet according to claim 14, wherein:

from the annular end face, the spring plate extends radially outward and upward at an angle toward the lower end face of the transverse beam, and from the annular tip, the spring plate extends radially outward and downward at an angle toward the lower annular end face.

* * * * *